No. 670,560.  
O. HEYLMANN.  
VEHICLE BRAKE.  
(Application filed Dec. 13, 1900.)
Patented Mar. 26, 1901.
(No Model.)
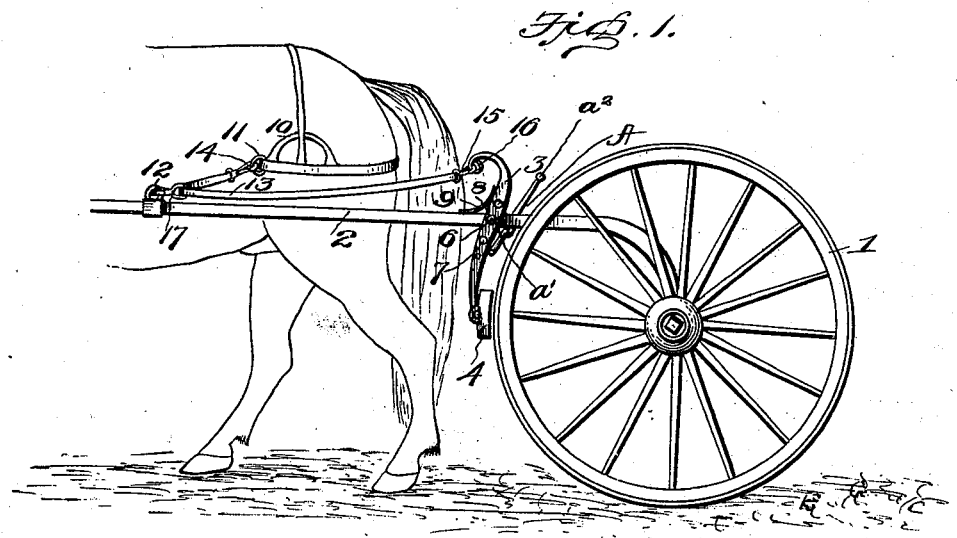
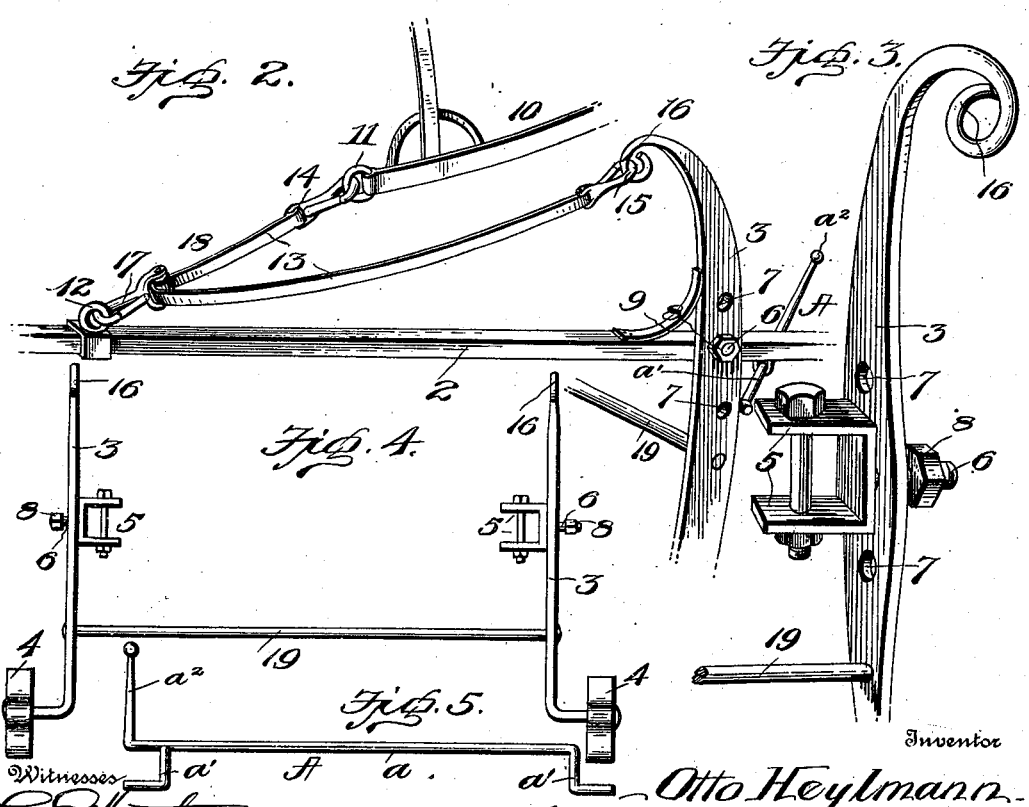

UNITED STATES PATENT OFFICE.

OTTO HEYLMANN, OF FALLBROOK, CALIFORNIA.

VEHICLE-BRAKE.

SPECIFICATION forming part of Letters Patent No. 670,560, dated March 26, 1901.

Application filed December 13, 1900. Serial No. 39,715. (No model.)

*To all whom it may concern:*

Be it known that I, OTTO HEYLMANN, a citizen of the United States, residing at Fallbrook, in the county of San Diego and State of California, have invented certain new and useful Improvements in Vehicle-Brakes; and I do declare the following to be a full, clear, and exact description of the invention, such as will enable others skilled in the art to which it appertains to make and use the same.

The invention relates to vehicle-brakes, and more particularly to that class of brakes which are automatically applied by the animal when the vehicle is traveling downgrade; and the object of the invention is to provide a device of this character which shall be simple of construction, durable in use, and comparatively inexpensive of production.

With this and other objects in view the invention consists in certain features of construction and combination of parts, which will be hereinafter more fully set forth.

In the accompanying drawings, Figure 1 is a side elevation showing my brake applied to a vehicle. Fig. 2 is an enlarged detail perspective view of a portion of one of the shafts, the brake-levers, a portion of the breeching, and the devices connecting the breeching with the brake-levers and shafts. Fig. 3 is an enlarged detail view of a fragment of the brake-levers, showing the clip for attaching them to the shafts; and Fig. 4 is a front view, on a small scale, of the brake-levers, showing them connected together. Fig. 5 is a detail perspective view of the brake-lock.

Referring to the drawings, 1 denotes the front wheels of a vehicle, which may be of any type, and 2 its shafts.

3 denotes brake-levers pivoted to the shafts near their rear ends and provided with brake-shoes 4, adapted to engage the front wheels of the vehicle. These brake-levers are preferably connected to the shafts by a clip 5, which embraces said shafts and is provided with a bolt 6, which is inserted through one of a series of holes 7, formed in the brake-levers, and is provided with a clamping-nut 8. That portion of the bolt upon which the lever turns is made smooth. A spring 9 is arranged in such position as to exert its energy and force the brake-shoes from engagement with the wheel. By adjusting the levers vertically, which may be accomplished by a vertical row of holes therein, I am enabled to vary the leverage to get a greater or less amount, as the occasion may require or the weight of the vehicle demand.

10 denotes the breeching, having at each side a loop 11.

12 denotes a ring made fast to each of the shafts, and 13 denotes drawback-straps, each of which has one end connected to one of the rings 11 and its other end connected to the upper end of one of the brake-levers and its bight or intermediate portion connected to the shaft. These connections are preferably effected by providing each end of the strap with snap-hooks 14 and 15, the former to engage the loop 11 of the breeching and the latter to engage an eye 16, formed at the upper end of the brake-levers, and by providing a snap-hook 17 to engage the rings 12 and constructing this snap-hook in such a manner as to permit of the engagement of the bight of the strap therewith. This is effected, preferably, by making one end of the snap-hook 17 forked and journaling in said forked end a roller 18, with which the bight of the strap engages. The brake-levers are prevented from separating by a connecting-rod 19, more clearly shown in the drawings.

In operation, assuming the vehicle to be going downhill, a gentle backward pressure of the animal against the breeching will cause the brake-shoes to be applied against the wheel, thus automatically checking the movement of the vehicle and giving the driver free and full use of his hands and making it wholly unnecessary for him to apply the brake with his feet. In unhitching the snap-hook 14 may be disengaged from the breech-loop 11, or, if it be desired to carry the strap with the harness, the snap-hooks 15 and 17 may be disengaged from their respective fastenings.

To prevent the brake being applied when backing the vehicle, I provide a brake-lock A, which may consist of a rod $a$, clipped to the lower sides of the shafts and provided with lugs $a'$, which are adapted to be rocked into engagement with the brake-levers by means of an operating-handle $a^2$ and lock said lever against swinging movement, thus permitting of the backing of the vehicle without the application of the brakes.

From the foregoing description, taken in connection with the accompanying drawings, the construction, operation, and advantages of my invention will be readily understood without requiring an extended explanation.

The device is exceedingly useful for the purpose for which it is designed and may be placed upon the market at a comparatively small cost.

Various changes in the form, proportion, and the minor details of construction may be resorted to without departing from the principle or sacrificing any of the advantages of my invention.

Having thus fully described my invention, what I claim as new, and desire to secure by Letters Patent, is—

1. The combination, with the shafts of a vehicle, of brake-levers applied thereto and carrying brake-shoes and harness-breeching, holdback-straps having the lower ends connected to the ends of the harness-breeching and to the ends of the brake-levers and loosely connected to said shafts, and a brake-locking device comprising a transversely-journaled shaft A having lugs $a$ at its ends adapted to be swung into the path of movement of said levers and provided with an operating-handle $a^2$.

2. The combination with the shafts of a vehicle, of brake-levers vertically adjustably pivoted thereto and carrying brake-shoes, a harness-breeching, and holdback-straps having their ends connected to the harness-breeching and to the ends of the brake-levers and loosely connected to said shafts, substantially as set forth.

In testimony whereof I have hereunto set my hand in presence of two subscribing witnesses.

OTTO HEYLMANN.

Witnesses:
MONTGOMERY M. MOULTON,
A. R. PHILLIPS.